US 12,205,464 B2

(12) United States Patent
Pedersen et al.

(10) Patent No.: US 12,205,464 B2
(45) Date of Patent: Jan. 21, 2025

(54) CONGESTION MANAGEMENT WITH CRUISE CONTROL

(71) Applicant: Nissan North America, Inc., Franklin, TN (US)

(72) Inventors: Liam Pedersen, San Francisco, CA (US); Fang-Chieh Chou, Sunnyvale, CA (US); Viju James, Fremont, CA (US); Najamuddin Mirza Baig, San Jose, CA (US); Katsuhiko Hirayama, Cupertino, CA (US); Abdul Rahman Kreidieh, Oakland, CA (US)

(73) Assignee: Nissan North America, Inc., Franklin, TN (US)

( * ) Notice: Subject to any disclaimer, the term of this patent is extended or adjusted under 35 U.S.C. 154(b) by 301 days.

(21) Appl. No.: 17/855,316

(22) Filed: Jun. 30, 2022

(65) Prior Publication Data
US 2024/0005790 A1    Jan. 4, 2024

(51) Int. Cl.
*G08G 1/0967* (2006.01)
*B60W 30/16* (2020.01)
*B60W 50/14* (2020.01)

(52) U.S. Cl.
CPC ....... *G08G 1/096775* (2013.01); *B60W 30/16* (2013.01); *B60W 50/14* (2013.01); *B60W 2554/4042* (2020.02); *B60W 2554/802* (2020.02); *B60W 2556/45* (2020.02)

(58) Field of Classification Search
CPC .......... G08G 1/096775; B60W 30/16; B60W 50/14; B60W 2554/4042; B60W 2554/802; B60W 2556/45; B60W 30/143
See application file for complete search history.

(56) References Cited

U.S. PATENT DOCUMENTS

| | | | | |
|---|---|---|---|---|
| 9,827,955 B2* | 11/2017 | Miller | ................ | B60W 20/12 |
| 2017/0015332 A1* | 1/2017 | Lonski | ................ | B60W 30/188 |
| 2020/0406894 A1* | 12/2020 | Akella | ................ | B60W 10/18 |
| 2022/0063660 A1* | 3/2022 | Poulet | ................ | B60W 60/005 |
| 2023/0278572 A1* | 9/2023 | Stent | ................ | B60W 50/10 |
| | | | | 701/23 |

FOREIGN PATENT DOCUMENTS

GB    2579346 A  *  6/2020 ............. G01C 21/26

OTHER PUBLICATIONS

"Adaptive Cruise Control" page from Wikipedia, downloaded off The Wayback Machine Jun. 19, 2022 (Year: 2022).*

* cited by examiner

*Primary Examiner* — Peter D Nolan
*Assistant Examiner* — Tanya C Sienko
(74) *Attorney, Agent, or Firm* — Young Basile Hanlon & MacFarlane, P.C.

(57) ABSTRACT

A control signal related to a road segment is received by a processor of a vehicle from a remote server. Using at least a portion of the control signal, a cruise control parameter for controlling the vehicle is obtained. Responsive to determining that a cruise control module of the vehicle is enabled, the cruise control module is configured to use the cruise control parameter. The cruise control module operates to maintain the cruise control parameter for the vehicle.

19 Claims, 12 Drawing Sheets

CONGESTION MANAGEMENT WITH CRUISE CONTROL

TECHNICAL FIELD

This disclosure relates generally to connected vehicles and connected automated vehicles, and more particularly to generating and using a long-term shared world model of a roadway for operation of connected vehicles.

BACKGROUND

Traffic congestion has a high cost, for example, in lost person-hours, excess carbon emissions, and increased likelihood of vehicle accidents. The proportion of vehicles on a roadway that are connected vehicles (CVs), capable of at least transmitting data over a network, and connected automated vehicles (CAVs), capable of at least transmitting data over the network and receiving control signals over the network, is increasing.

SUMMARY

A first aspect is a method that includes receiving from a remote server and by a processor of a vehicle a control signal related to a road segment; obtaining, using at least a portion of the control signal, a cruise control parameter for controlling the vehicle; and, responsive to determining that a cruise control module of the vehicle is enabled, configuring the cruise control module to use the cruise control parameter. The cruise control module operates to maintain the cruise control parameter for the vehicle.

A second aspect is a vehicle that includes a cruise control module and a congestion controller that is configured to input cruise control configuration parameters to the cruise control module. The congestion controller is configured to receive, from a remote server, a control signal related to a road segment; obtain, using at least a portion of the control signal, a cruise control parameter for controlling the vehicle; and configure the cruise control module to use the cruise control parameter.

A third aspect is a non-transitory computer-readable medium storing instructions which, when executed by a processor of a vehicle, cause the processor to perform operations that include receiving, from a remote server, a control signal related to a road segment; obtaining, using at least a portion of the control signal, a cruise control parameter for controlling the vehicle; and, responsive to determining that a cruise control module of the vehicle is enabled, configuring the cruise control module to use the cruise control parameter. The cruise control module operates to maintain the cruise control parameter for the vehicle.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects disclosed herein will become more apparent by referring to the examples provided in the following description and drawings in which like reference numbers refer to like elements.

DETAILED DESCRIPTION

Figure 1:
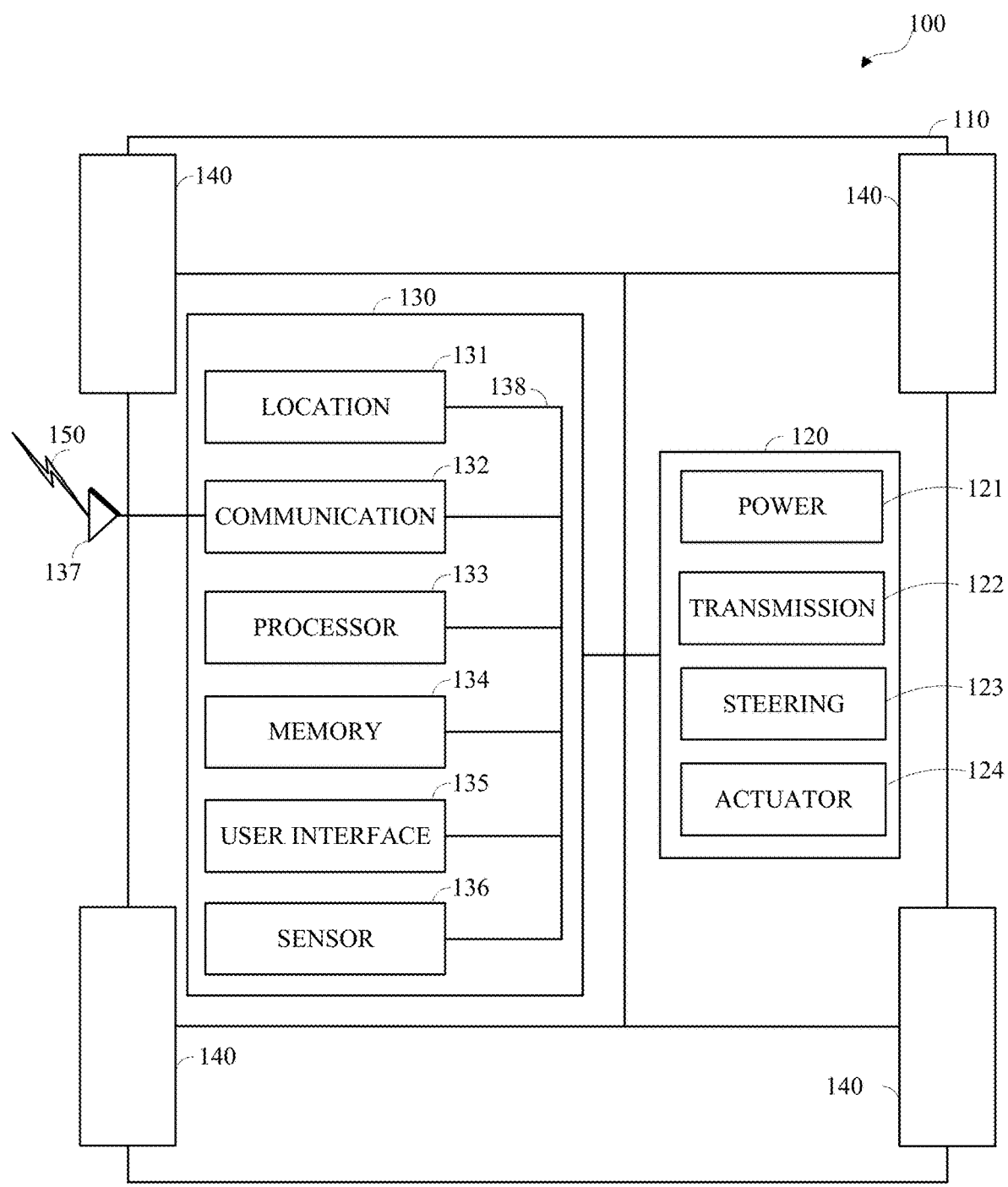
FIG. 1 is a diagram of an example of a vehicle in which the aspects, features, and elements disclosed herein may be implemented.

As described above, traffic congestion has a high cost, for example, in lost person-hours, excess carbon emissions, and increased likelihood of vehicle accidents. The proportion of vehicles on a roadway that are connected vehicles (CVs), capable at least of transmitting data over a network, and connected automated vehicles (CAVs), capable at least of transmitting data over the network and receiving control signals over the network, is increasing. Techniques for leveraging CV or CAV technology for reducing traffic congestion may be desirable.

According to some embodiments, a vehicle control server (which may be implemented as one or more physical or virtual machines) accesses vehicle data from each CV of a subset of multiple CVs on a roadway portion. The vehicle data may also be accessed from roadway sensors. The vehicle data may include a position of the vehicle providing the data or another vehicle, a velocity of the vehicle providing the data or another vehicle, and/or a following distance of the vehicle providing the data or another vehicle. The vehicle control server stores the accessed vehicle data in a long-term shared world model. The vehicle control server generates, using the long-term shared world model, a data structure representing predicted future velocities on the roadway portion by position and time by applying a traffic flow model to the long-term shared world model. The traffic flow model may be, for example, an artificial intelligence model trained using at least one of supervised learning, unsupervised learning, reinforcement learning, online learning, or the like.

The vehicle control server transmits, such as to a CV, a control signal for controlling operation of the CV based on the generated data structure. More generally, the control signal can be transmitted with respect to any vehicle that includes a cruise control module (i.e., function or system) that is a longitudinal motion control module.

Transmitting the control signal with respect to a vehicle includes transmitting the control signal to a controller of the vehicle, or transmitting the control signal to a device of a person (e.g., a driver or an occupant) associated with the vehicle. For example, the device may be a portable device of the person and that may include or execute an application associated with the vehicle.

In an example, the control signal can be a specific cruise control parameter (i.e., specific cruise control parameter values) that may be used to set (e.g., configure) a cruise control module (i.e., function) of the CV. The cruise control module may be configured by a controller (referred to herein as a congestion controller) that receives the cruise control parameter and configures the cruise control module according to the cruise control parameter. In another example, an occupant of the vehicle may configure a cruise control module of the vehicle using (e.g., according to or based on) the cruise control parameter. For example, the cruise control parameter may be received on a device of the occupant who in turn configures the cruise control module of the vehicle based on the received cruise control parameter. In an example, the cruise control parameter may be displayed on a display of the vehicle and the occupant can configure the cruise control module of the vehicle based on the received cruise control parameter.

In another example, the control signal can be or include data that the CV (i.e., a congestion controller therein) can use to obtain the cruise control parameter. For example, the congestion controller may be or include a machine leaning model that uses at least portions of the control signal to obtain (e.g., infer, output) the cruise control parameter that can be used to configure the cruise control module of the CAV. As further described herein, the cruise control parameter is such that it results in (e.g., is calculated to result in, is predicted to result in, is inferred to result in) traffic congestion control so as to at least reduce stop-and-go traffic.

The cruise control parameter can depend on the capabilities of the cruise control module of the vehicle. The cruise control module of the vehicle may be capable of only maintaining a configured speed (referred to as a cruise control (CC) module) or may be an Adaptive Cruise Control (ACC) that is capable of maintaining both a configured speed and a configured headway for the vehicle. An ACC module is a CC module; but a CC module is not necessarily an ACC module.

As is known, a conventional ACC module of a CAV may use sensor data (such as data from a RADAR or LIDAR) to detect a distance between the CAV and a leading vehicle and the relative speed difference between the CAV and the leading vehicle. The conventional ACC automatically adjusts the speed of the CAV to maintain a configured distance behind the leading vehicle, which may be set by, for example, a driver of the CAV to a desired following distance and/or a time gap to be maintained between the CAV and the leading vehicle.

Stated another way, a conventional ACC module uses feedback from vehicle sensors (such as speed, lead vehicle distance, lead vehicle closing velocity, and the like) to maintain either a set speed or a minimum distance from the leading vehicle travelling at less than the set speed. A driver can adjust the set speed and headway (follow distance) using controls in the vehicle.

At least a portion of the cruise control parameter may be usable by the cruise control module of the vehicle. For example, in the case of a CC module, the cruise control parameter can be or include a speed or a velocity that is usable by the CC module. In the case of an ACC module, the cruise control parameter can additionally include a headway.

As used herein, the term "model" may include, among other things, at least one of a classic planning model, an artificial intelligence (AI) model, or a machine-learning (ML) model that uses supervised learning, unsupervised learning, reinforcement learning, or the like. A model may be based on data that was generated in the past and may be used to predict future data. For example, a long-term shared world model of a roadway portion may store data about average velocities and congestion (e.g., number of vehicles per unit distance) of the roadway portion in the past (e.g., at multiple times in the past three years) and be used to predict the average velocities and the congestion of the roadway portion in the future (e.g., next Monday morning at 9 am). The prediction may be made, for example, using AI or ML techniques or other mathematical modeling techniques.

As used herein, the term "shared" may indicate, among other things, that a shared item is accessed by at least two entities. For example, at least two vehicles may contribute data to and/or receive data derived from a shared model. As used herein, the term "long-term" indicates that data is based on a time period exceeding a threshold. For example, a long-term model may be based on data generated over a time period that exceeds one hour, two hours, one day, three days, one week, five weeks, one month, six months, one year, or the like. As used herein, the term "world" may indicate, among other things, data that is based on two or more points in space.

As used herein, a roadway portion may include a contiguous portion of a roadway (e.g., a 1-2 kilometer stretch of a roadway). A roadway portion may be subdivided into multiple roadway segments. For example, a 1-kilometer roadway portion may be divided into mutually exclusive and collectively exhaustive roadway segments of 100 meters each.

It should be noted that every CAV is a CV. However, a vehicle may be a CV but not a CAV. For example, a vehicle that is operated by a human driver that is capable of transmitting over a network would be a CV but not a CAV. In some implementations, with appropriate permission, CV technology may be implemented by a computing device (e.g., a mobile phone) on board a vehicle. For example, the computing device may determine the vehicle's velocity (e.g., using an on-device global positioning system (GPS) and an on-device clock) and transmit the vehicle's velocity over a network.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or velocity, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a velocity sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
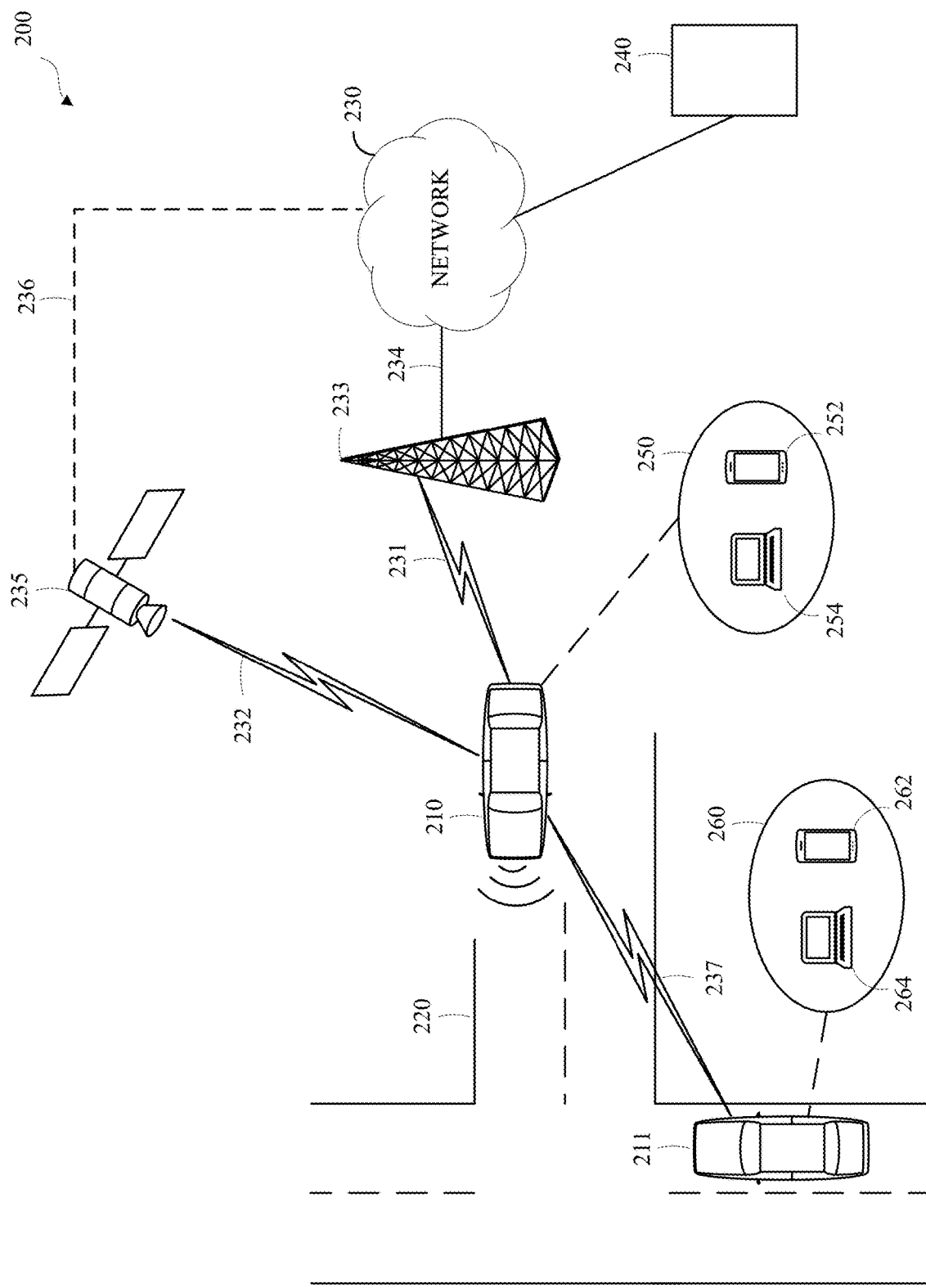
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110211. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, velocity information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a velocity sensor, a wheel velocity sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, velocity limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
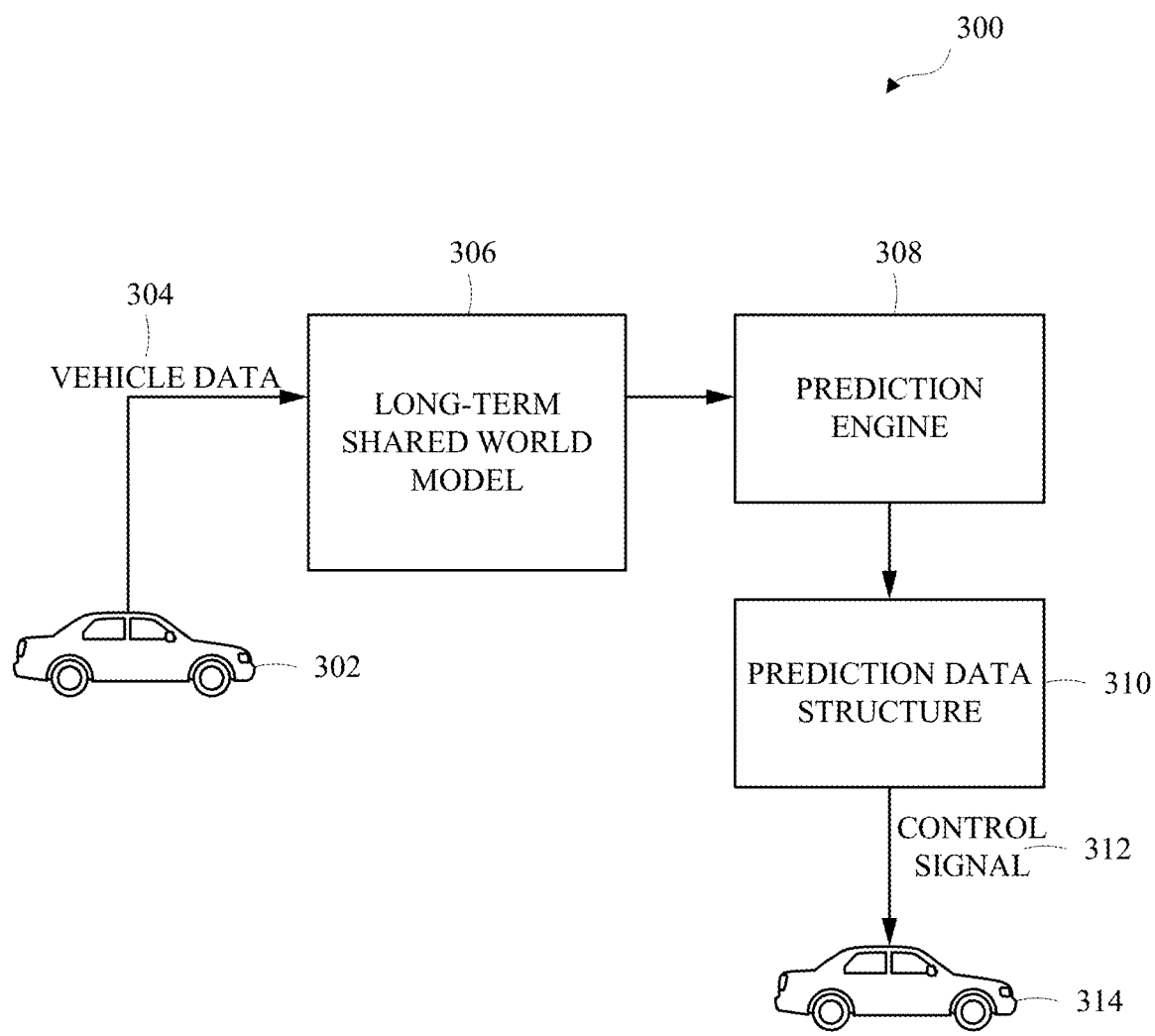
FIG. 3 is a data flow diagram of a technique for using vehicle data to generate a control signal in accordance with embodiments of this disclosure.

FIG. 3 is a data flow diagram of a technique 300 for using vehicle data to generate a control signal in accordance with embodiments of this disclosure.

As shown, a connected vehicle (CV) 302 transmits vehicle data 304 to a long-term shared world model 306. While a single CV 302 is illustrated, multiple CVs, including the CV 302, may transmit vehicle data 304 to the long-term shared world model 306. The vehicle data 304 may include at least one of location data, velocity data, headway (e.g., following distance) data, or the like. The vehicle data 304 may relate to the CV or other vehicles proximate to the CV. While the vehicle data 304 is shown to be transmitted from the CV 302, all or a portion of the vehicle data may be transmitted from a roadway sensor (e.g., a radar, lidar, or computer vision-based sensor). The vehicle data 304 can be used to generate or modify the long-term shared world model 306. The long-term shared world model 306 stores historic traffic velocity, congestion, and/or headway data about multiple roadway segments and may be used to predict future traffic velocity, congestion, and/or headway data for all or a portion of the multiple roadway segments. As shown, a prediction engine 308 accesses the long-term shared world model 306 to make a prediction about future traffic velocity, congestion, and/or headway data for a roadway segment. The prediction is stored in a prediction data structure 310. A control signal 312 is generated based on the prediction data structure 310 and transmitted to a connected automated vehicle (CAV) 314. The control signal 312 controls a velocity or a travel path of the CAV 314.

The location data may represent the geographic location of a vehicle. For example, the location data may indicate the latitude and the longitude of the vehicle, the street address of the vehicle, or another identifier of a geographic location. The location data may be obtained, at the vehicle, using roadway sensors, using global positioning system (GPS) technology, and/or using cellular tower triangulation. The velocity data represents a velocity and a direction of travel of the vehicle. The velocity data may include a measurement in units of velocity (e.g., kilometers per hour) and a direction (e.g., n degrees east of north, where n is a number). The headway data represents a distance between a front end of a vehicle and a front end (or, alternatively back end) of another vehicle that the vehicle is following. The headway data may be measured in units of distance (e.g., meters).

The CV 302 and/or the CAV 314 may correspond to one or more of the vehicles 100, 210, 211. The long-term shared world model 306, the prediction engine 308, and/or the prediction data structure 310 may be implemented using software and/or hardware residing at a server connected to the vehicle transportation networks 220 and/or the electronic communications networks 230. For example, the long-term shared world model 306, the prediction engine 308, and/or the prediction data structure 310 may be implemented using software and/or hardware residing at the communication device 240.

According to some implementations, the long-term shared world model 306 accesses and stores vehicle data 304 from the CV 302. The prediction engine 308 generates, using the long-term shared world model 306, the prediction data structure 310, which represents predicted future velocities on the roadway portion by position and time by applying a traffic flow model to the long-term shared world model 306. The traffic flow model is based on at least one of: an average vehicle velocity in at least one roadway segment during a time slice, a vehicle density in the at least one roadway segment during the time slice, or a flow or net flow of vehicles into or out of the at least one roadway segment during the time slice. The control signal 312 is generated based on the prediction data structure 310, and transmitted to the CAV 314 for controlling operation (e.g., a velocity or a travel path) thereof. The term "time slice" may include, among other things, a contiguous time period, for example, the time period between 4:00 pm and 4:02 pm on Feb. 1, 2022.

Figure 4:
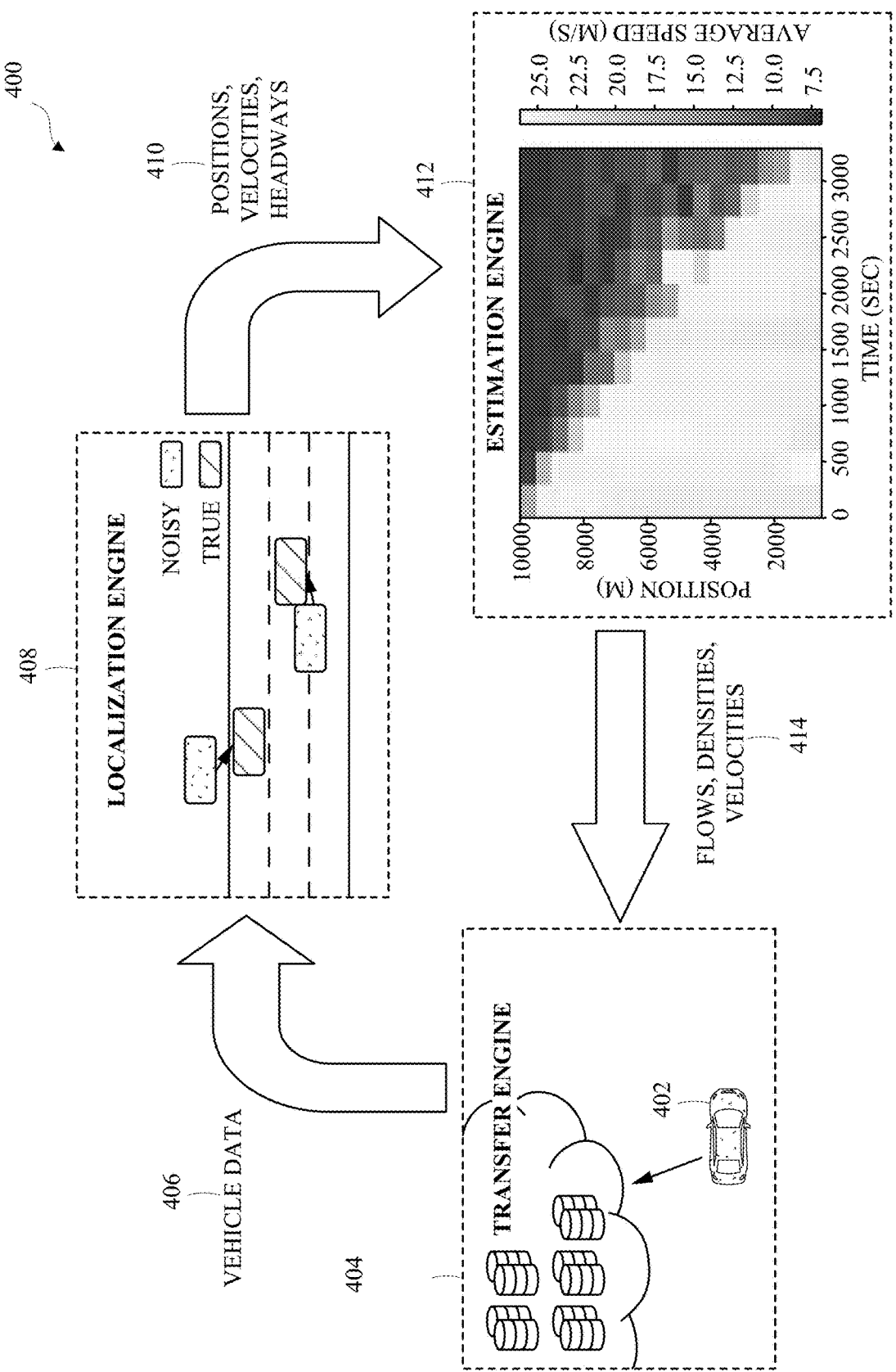
FIG. 4 is a data flow diagram of a long-term shared world model architecture in accordance with embodiments of this disclosure.

FIG. 4 is a data flow diagram of an architecture 400 of a long-term shared world model in accordance with embodiments of this disclosure. As shown, a vehicle 402 provides vehicle data (e.g., GPS data) to a transfer engine 404. The transfer engine 404 transfers the vehicle data 406 to the localization engine 408. The localization engine 408 computes positions, velocities, and headways 410 of vehicles and provides the positions, velocities, and headways 410 to an estimation engine 412. The estimation engine 412 estimates the flows, densities, and velocities 414 and provides the data to the transfer engine 404 and to the vehicle 402 for controlling the vehicle (e.g., by an autonomous driving engine or by a human driver).

Some implementations relate to reducing traffic congestion. A long-term shared world model, such as the long-term shared world model 306 of FIG. 3 or the one described with respect to FIG. 4, may include a traffic state estimator that collects and aggregates data from probe vehicles throughout a network to produce meaningful macroscopic predictions of the state and evolution of traffic. This information is maintained within a database (or other data storage unit) and provided to control policies at later stages to assist in improving the decision-making and coordination by CVs and CAVs.

The transfer engine 404 aggregates data into the vehicle data 406 from the vehicle 402 (which may be a CV or a CAV) and, in some cases, other vehicles, into a shared data repository stored on a network and accessible in real-time. The transfer engine 404 may collect GPS, controller area network (CAN), and other available data sources from the vehicles 402 and may transmit these data to a server. The transfer engine 404 also stores data that is accessible by the vehicle 402. The structure of the shared repository available may be optimized to reduce the overhead associated with storing and accessing individual vehicle data-points.

The localization engine 408 extracts and processes relevant information from the vehicle data 406. The vehicle data 406 may be collected from the shared data repository. The localization engine 408 may perform filtering operations to reduce noise. Information gathered by the localization engine 408 for each vehicle i at time t may include the information shown in Table 1.

TABLE 1

| Information | Description |
|---|---|
| $x_i(t)$ | Position of vehicle i (from some fixed reference point). |
| $v_i(t)$ | Velocity of vehicle i. |
| $h_i(t)$ | Headway between vehicle i and the vehicle leading the vehicle i (front-to-front bumper). |
| $v_{i,lead}(t)$ | Velocity of lead vehicle in the same lane as the vehicle i. |
| $v_{i,lead}^L(t)$ | Velocity of lead vehicle in the lane to the left of the vehicle i. |
| $h_{i,lead}^L(t)$ | Headway of lead vehicle in the lane to the left of the vehicle i. |
| $v_{i,follow}^L(t)$ | Velocity of following vehicle in the lane to the left of the vehicle i. |
| $h_{i,follow}^L(t)$ | Headway of following vehicle in the lane to the left of the vehicle i. |
| $v_{i,lead}^R(t)$ | Velocity of lead vehicle in the lane to the right of the vehicle i. |
| $h_{i,lead}^R(t)$ | Headway of lead vehicle in the lane to the right of the vehicle i. |
| $v_{i,follow}^R(t)$ | Velocity of following vehicle in the lane to the right of the vehicle i. |
| $h_{i,follow}^R(t)$ | Headway of following vehicle in the lane to the right of the vehicle i. |

The estimation engine 412 collects the information stored by the transfer engine 404 and modified by the localization engine 408 (e.g., the positions, velocities, and headways 410) and uses this information to approximate the macroscopic state of traffic at different roadway segments. In particular, consider a roadway portion of length L and a total time of T seconds. N and M are integers. The estimation engine 412 discretizes time and space in N steps $J_j$ (0<=j<=N) of length $\Delta t=T/N$ and M space cells $I_i$ (0<=i<=M) of length $\Delta x=L/M$, and for each time-space region computes the metrics shown in Table 2.

TABLE 2

| | |
|---|---|
| $v_i^j$ | The average velocity of vehicles in roadway segment i over time interval j. |
| $p_i^j$ | The vehicle density in roadway segment i over time interval j. |
| $q_i^j$ | The flow of vehicles from roadway segment i to roadway segment i + 1 over time interval j. |

The information computed by the estimation engine 412 (e.g., the flows, densities, and velocities 414) is provided to the transfer engine 404 for storage in data repositories or for use by vehicles (e.g., the vehicle 402) communicating with the transfer engine 404.

One advantage of the architecture 400 is the flexibility provided by the modularity of the different sub-components. This allows some implementations to generalize various features to a number of different vehicles and estimation algorithms. For example, if multiple vehicles with different sensing, communication specifications, or both are utilized, the errors associated with each type of vehicle may be regulated by utilizing a different localization module for each vehicle type, while maintaining all other modules static. Moreover, if the penetration effects or other specifications request that a different estimation traffic state estimation algorithm is to be used, this may simply be replaced without modification of anything else.

The data repositories in the transfer engine 404 may be databases (e.g., SQL, MongoDB, or the like) or other data storage units. The type of information shared between vehicles (e.g., the vehicle 402) accessing the transfer engine 404 may depend on the sensors available onboard. The localization engine 408 may use different filtering techniques for accessing and processing historical data. The estimation engine 412 may leverage different traffic state estimators. For example, statistical or data-driven estimators may be used to produce modestly granular results when less than a threshold amount of data is available. Model-based estimators (e.g., AI or ML estimators) may be used to produce finer-grained estimations when more than the threshold amount of data is available.

For CVs and CAVs to efficiently, directly or indirectly, cooperate to regulate the flow of traffic, the long-term shared world model 306 of FIG. 3 (or other shared models of traffic state) may be used. Traffic state estimation algorithms may provide techniques for defining such models. Some techniques convert local vehicle sensor data—vehicle positions, headways, and velocities—in quantities capable of defining the shared state among the vehicles in a region of space and time (e.g., one or more roadway portions). Some techniques rely on sparse quantities of data, due, among other things, to limitations in sensing infrastructure. The rise of vehicle automation has greatly improved the quality placed on onboard vehicle sensing, producing vehicles that can perceive not only what is in front of the vehicles, but also what is happening in adjacent lanes. Some implementations leverage the improvement occurring in sensing infrastructure and define a procedure through which these additional observations may be used to improve the quality of existing traffic state estimation techniques.

Figure 5:
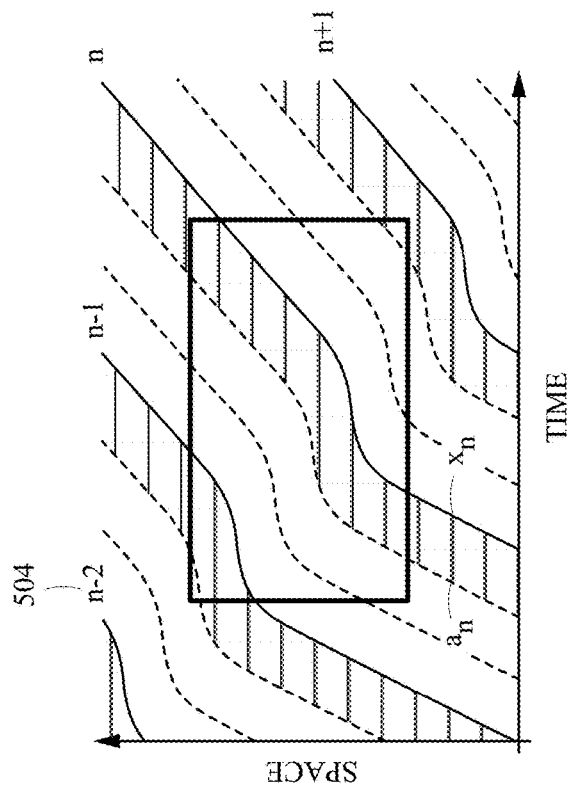
FIG. 5 illustrates flow graphs over space and time in accordance with embodiments of this disclosure.
Figure 5:
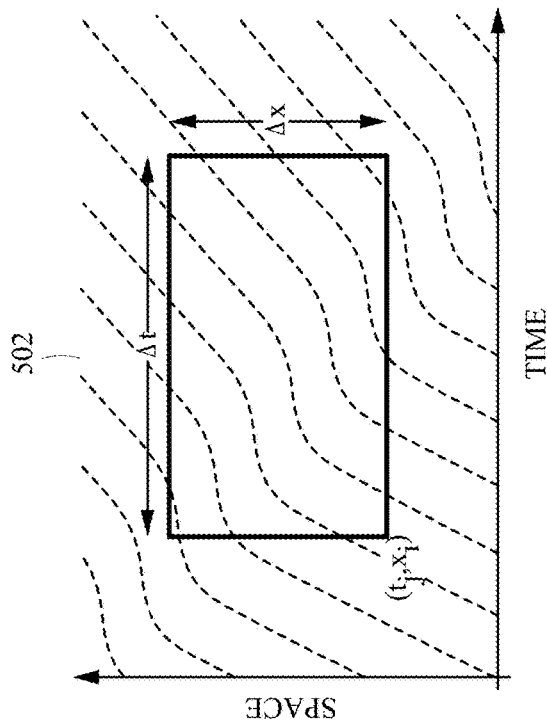
Figure 6:
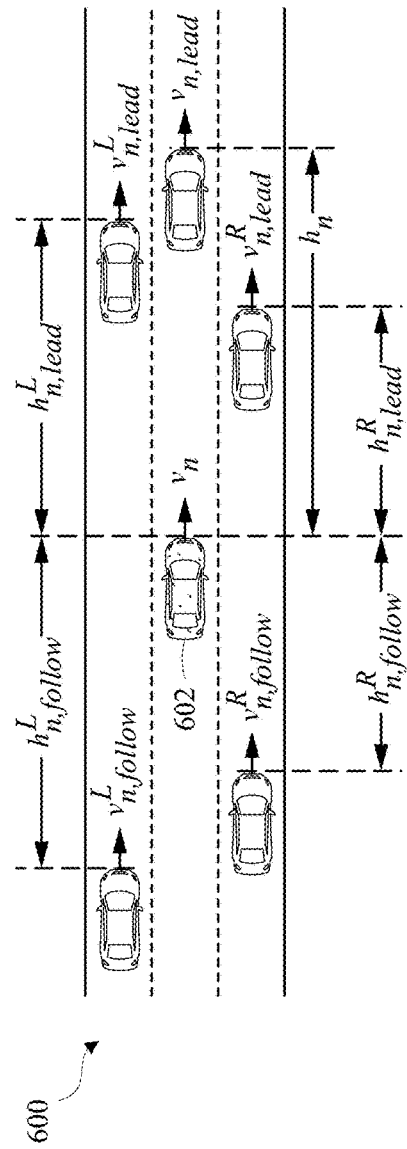
FIG. 6 illustrates the velocity and headway values that are measured for a probe vehicle in accordance with embodiments of this disclosure.

FIG. 5 illustrates flow graphs over space and time. Graph 502 depicts a time-space region and graph 504 depicts data used in the prediction technique disclosed herein. FIG. 6 illustrates the velocity and headway values 600 that are measured for a probe vehicle 602.

Traffic congestion increases fuel consumption and greenhouse gas emissions while reducing driving comfort and driving safety. Techniques for reducing traffic congestion using connected and/or automated vehicle technology may be desirable.

In some implementations, a portion of vehicles are connected vehicles (vehicles being able to share information to the cloud, but driven manually by human drivers), a portion of vehicles are connected and automated vehicles (vehicles that can share information and are automatically controlled by the cloud), and a portion of vehicles are human-driven vehicles that are neither connected nor automated (without connectivity to the cloud). CVs and CAVs may share, with the cloud, traffic-related measurements with on-board sensors, including vehicle speed, acceleration, relative distances and relative speeds, with surrounding vehicles, and the like.

Figure 7:
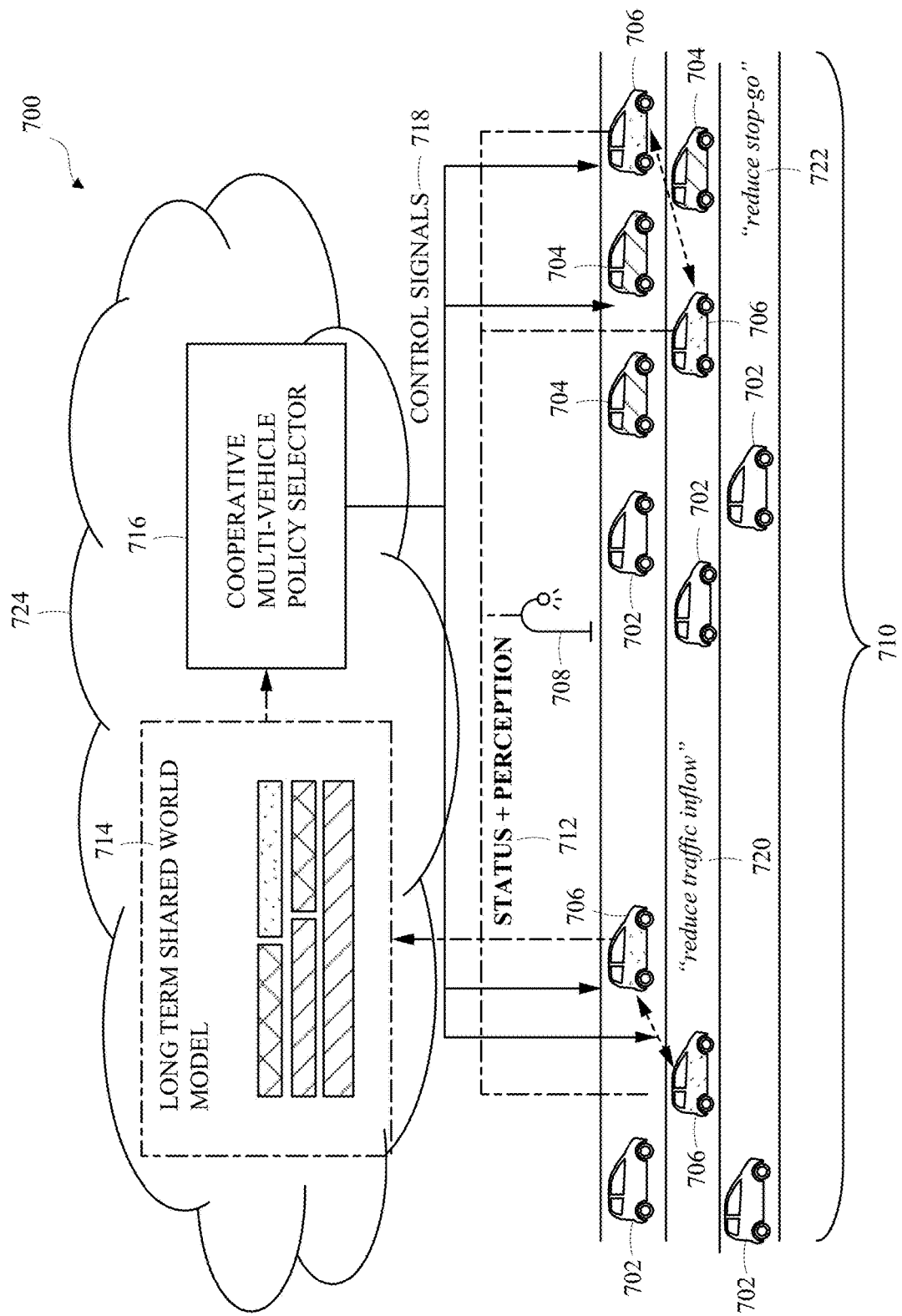
FIG. 7 illustrates an example vehicle communication and control architecture in accordance with embodiments of this disclosure.

FIG. 7 illustrates an example vehicle communication and control architecture 700. As shown, the vehicle communication and control architecture 700 includes non-connected vehicles 702, CVs 704, CAVs 706, and a roadside unit (RSU) 708 on a roadway portion 710. The non-connected vehicles 702 may be legacy vehicles that are operated by human drivers and may not be capable of transmitting traffic state information (e.g., velocity information, travel path information, or information obtained by on-board sensors) to a network. The RSU 708 may include a router for transmitting and receiving network communications to and from the CVs 704 and the CAVs 706. The RSU 708 may include a roadway sensor (e.g., a camera system, a radar system or a lidar system). As shown, the CVs 704, the CAVs 706, and the RSU 708 communicate status and perception data 712 for generating a long-term shared world model 714. The long-term shared world model 714 may correspond to the long-term shared world model 306. As shown, the long-term shared world model 714 is accessed by a cooperative multivehicle policy selector 716. The cooperative multivehicle policy selector 716 transmits control signals 718 to the CAVs 706. The control signals 718 are coordinated and optimized to achieve a traffic control goal, such as reducing traffic inflow 720 or reducing stop-and-go traffic 722 at various parts of the roadway portion 710. As shown, the long-term shared world model 714 and the cooperative multivehicle policy selector 716 are stored on a network 724, for example, at servers or data repositories connected to the network 724.

According to some implementations, by means of wireless communication, an engine of the network 724 (e.g., the long-term shared world model 714 or the cooperative multivehicle policy selector 716) receives and sends information to and from the CVs 704 and/or the CAVs 706. The status and perception data 712 from CVs 704 and/or the CAVs 706 is processed and then control signals 718 are sent to CAVs 706.

The long-term shared world model 714 is a real-time and precise traffic state model based on the status and perception data 712 from the CVs 704 and the CAVs 706. The long-term shared world model 714 is used to provide, to the cooperative multivehicle policy selector 716, information necessary for generating the control signals 718 for the CAVs 706. The data from the long-term shared world model 714 may be used in two ways—to directly share traffic conditions with the CAVs 706 to allow each CAV 706, using its on-board computer, to adapt to the traffic conditions or to have the cooperative multivehicle policy selector 716 determine optimal actions for the CAVs 706 based on macroscopic metrics (e.g., network throughput, traffic speed variations, greenhouse gas emissions, or the like). The optimal action for each CAV 706 is communicated to the associated CAV 706, from the cooperative multivehicle policy selector 716, using the control signals 718. By coordinating the driving behavior of the CAVs 706, traffic flow can be controlled and optimized more effectively, traffic inflow may be reduced in a region of the roadway, and/or stop-go traffic may be reduced.

Figure 8:
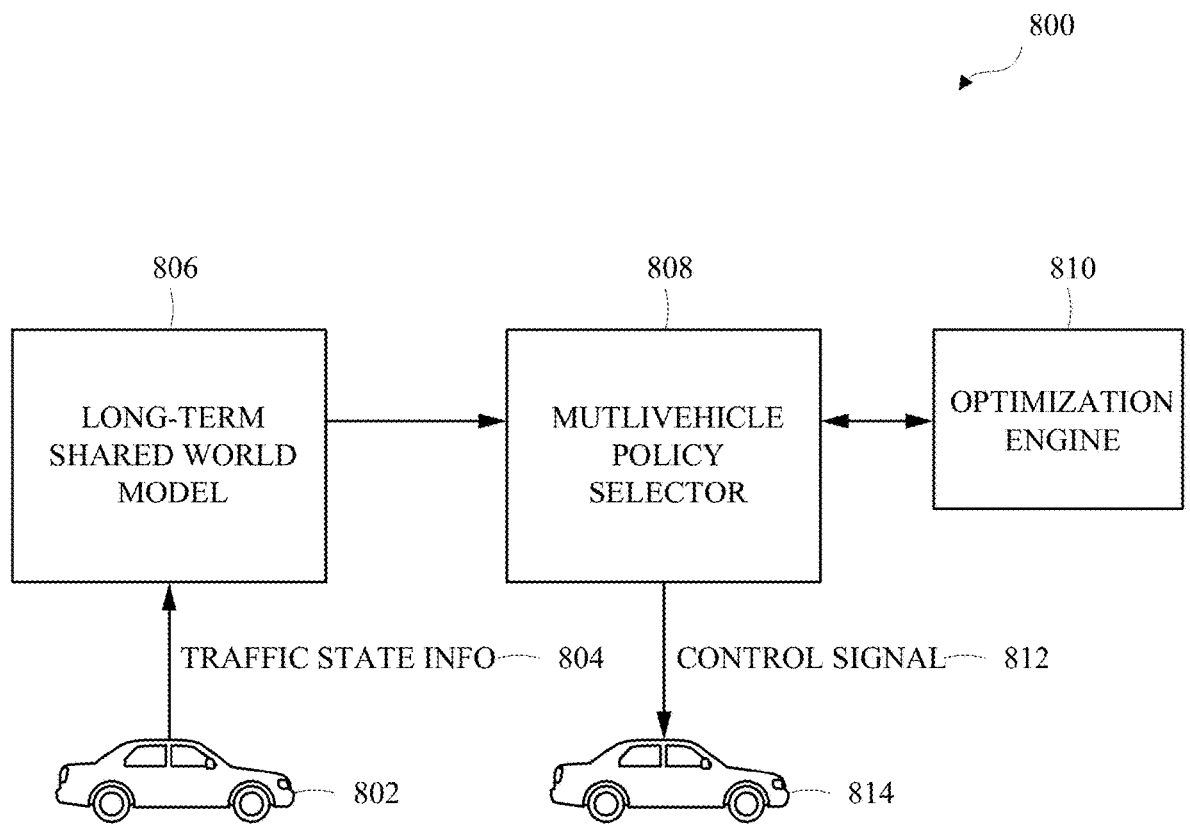
FIG. 8 is a data flow diagram for vehicle communication and control in accordance with embodiments of this disclosure.

FIG. 8 is a data flow diagram for vehicle communication and control 800 in accordance with embodiments of this disclosure. As shown, a CV 802 generates traffic state information 804 and provides the traffic state information 804 to the long-term shared world model 806. The CV 802 may correspond to one of the CVs 704 or one of the CAVs 706. The traffic state information 804 may correspond to the status and perception data 712 or other information generated by or available at the CV 802. The long-term shared world model 806 may correspond to at least one of the long-term shared world models 306, 806.

As shown, the long-term shared world model 806 communicates data to a multivehicle policy selector 808 (e.g., the cooperative multivehicle policy selector 716). The multivehicle policy selector 808 leverages an optimization engine 810 to optimize for traffic conditions (e.g., reducing traffic inflow to a high traffic area and/or reducing stop-and-go traffic) in order to generate a control signal 812 (e.g., from among the control signals 718) for a CAV 814 (e.g., one of the CAVs 706). The multivehicle policy selector 808 transmits the control signal 812 to the CAV 814. The CAV 814 adjusts its operation (e.g., its speed or its travel path) based on the control signal 812.

Figure 9:
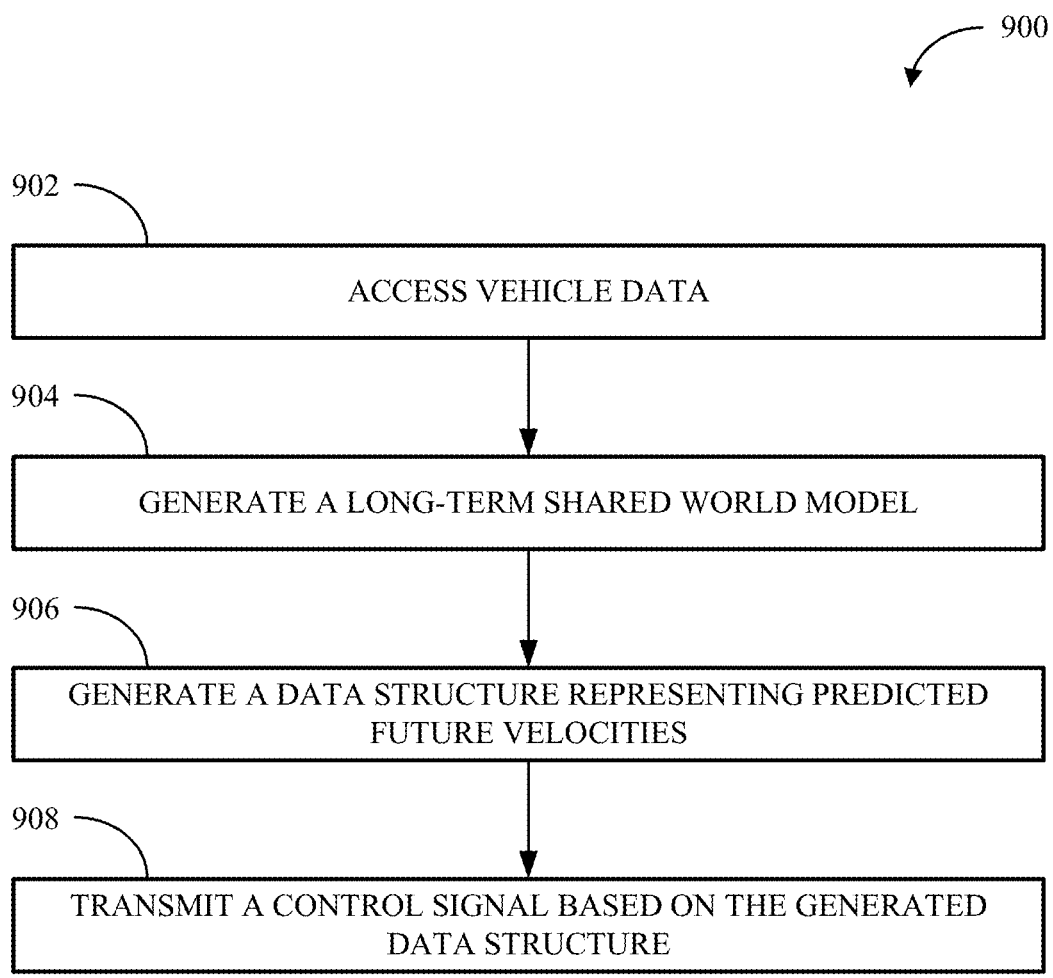
FIG. 9 is a flow chart of a technique for operating a vehicle using a long-term shared world model in accordance with embodiments of this disclosure.

FIG. 9 is a flow chart of a technique 900 for operating a vehicle using a long-term shared world model in accordance with embodiments of this disclosure. The technique 900 may be implemented using a server. The server may include a server connected to the vehicle transportation networks 220 and/or the electronic communications networks 230. The server may include a single computing device or multiple computing devices working together.

At block 902, the server accesses vehicle data from each CV of a subset of a plurality of CVs on a roadway portion. The vehicle data may include at least one of a position, a velocity, or a headway. The server may also access additional data from a roadway sensor. The additional data may include vehicle position data, vehicle velocity data, and/or vehicle headway data. The additional data may be sensed, at the roadway sensor, using computer vision, radar, and/or lidar. The vehicle data may be associated with the CV itself or another vehicle (e.g., another CV or a non-connected vehicle) proximate to the CV whose data is accessible by on-board sensors of the CV. The additional data may be associated with either a CV or a non-connected vehicle.

At block 904, the server generates, based on the accessed vehicle data and/or the additional data, a long-term shared world model (e.g., one of the long-term shared world models 306, 806). In some cases, the accessed vehicle data is received from a first vehicle and includes the position, the velocity, or the headway of a second vehicle. The first vehicle is distinct from the second vehicle. For example, the second vehicle may be traveling immediately in front of the first vehicle, immediately behind the first vehicle, or in a driving lane adjacent to a driving lane of the first vehicle.

At block 906, the server generates, using the long-term shared world model, a data structure representing predicted future velocities on the roadway portion by position and time by applying a traffic flow model to the long-term shared world model. For example, the data structure may be a two-dimensional array with one dimension representing roadway segments and another dimensions representing time slices. The value in each cell of the two-dimensional array may represent a predicted future velocity for the corresponding roadway segment and time slice.

According to some implementations, the roadway portion is subdivided into multiple roadway segments. The traffic flow model is based on at least one of an average vehicle velocity in at least one roadway segment during a time slice, a vehicle density in the at least one roadway segment during the time slice, or a flow or net flow of vehicles into or out of the at least one roadway segment during the time slice. The average vehicle velocity, the vehicle density, the flow, or the net flow may be computed using the long-term shared world model.

At block 908, the server transmits, to a CAV, a control signal for controlling operation of the CAV based on the generated data structure. The CAV may adjust its operation based on the control signal. For example, the CAV may adjust its velocity or its travel path based on the control signal.

Figure 10:
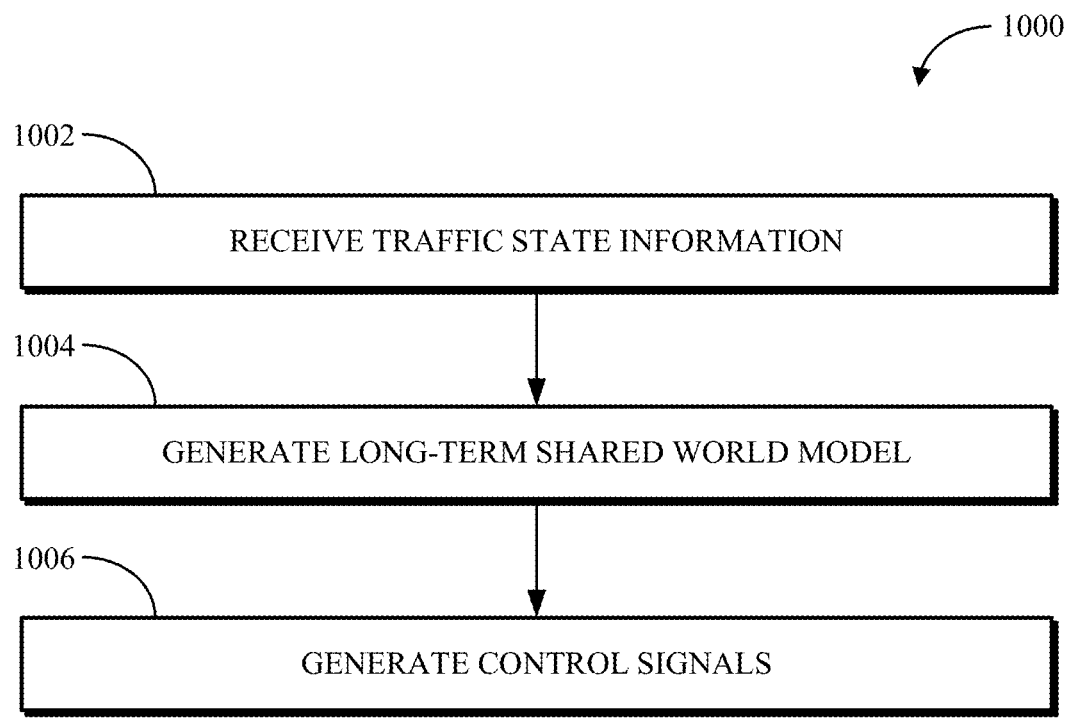
FIG. 10 is a flow chart of a technique for controlling a vehicle using a multivehicle policy selector in accordance with embodiments of this disclosure.

FIG. 10 is a flow chart of a technique 1000 for controlling a vehicle using a multivehicle policy selector in accordance with embodiments of this disclosure. The technique 1000 may be implemented using a server. The server may include a server connected to the vehicle transportation networks 220 and/or the electronic communications networks 230. The server may include a single computing device or multiple computing devices working together.

At block 1002, the server receives traffic state information from roadway sensors, CVs, and CAVs. The traffic state information may include at least one of a location of a vehicle, a speed of the vehicle, a following distance between the vehicle and another vehicle, and a number of vehicles on the roadway portion. The vehicle may be a non-connected vehicle, a CV, or a CAV. For the non-connected vehicle, the traffic state information may be determined (and transmitted to the server) by at least one of a roadway sensor, a CV, or a CAV proximate to the non-connected vehicle. The CVs, CAVs, and/or non-connected vehicles may be traveling on the roadway portion. Alternatively, the CVs, CAVs, and/or non-connected vehicles may include a vehicle that is not traveling on the roadway portion (e.g., a vehicle that is approaching the roadway portion or a vehicle that has recently left the roadway portion).

At block 1004, the server generates, based on the received traffic state information, a long-term shared world model (e.g., one of the long-term shared world models 306, 806). The long-term shared world model may use any modeling technique. For example, the long-term shared world model may use statistical modeling, machine learning, or artificial intelligence techniques.

At block 1006, the server generates, using a multivehicle policy selector (e.g., the multivehicle policy selector 808), control signals to control the CAVs based on the long-term shared world model. The multivehicle policy selector generates the control signals using an optimization to reduce congestion on a roadway portion. Each control signal is transmitted to an associated CAV and controls a velocity or a travel path of the associated CAV. The optimization to reduce the congestion on the roadway includes ensuring at least a minimum threshold following distance between each CAV and a vehicle in front of the CAV.

Figure 11:
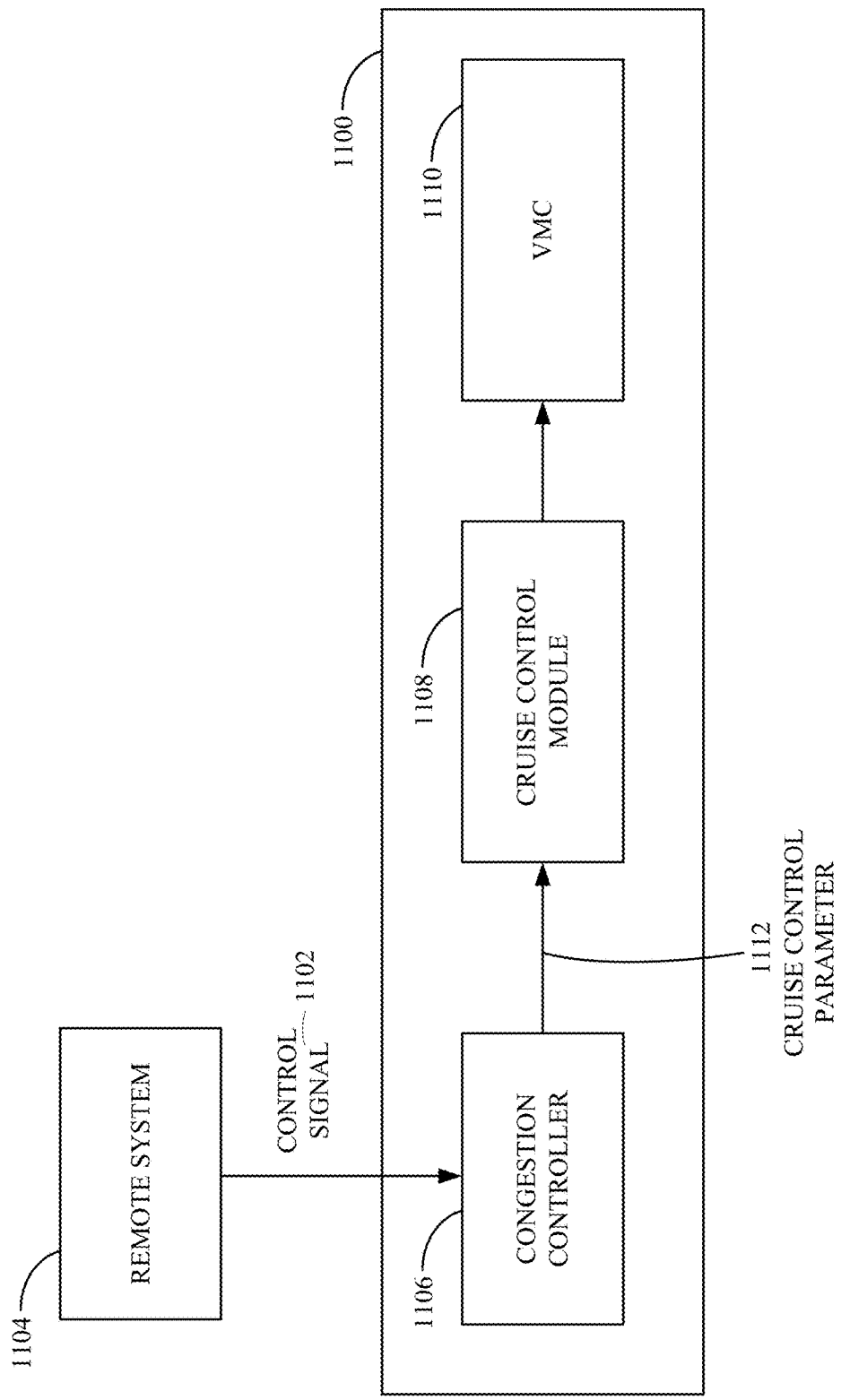
FIG. 11 is a flow diagram for configuring a cruise control module of a vehicle to use a cruise control parameter in accordance with embodiments of this disclosure.

FIG. 11 is a flow diagram for configuring a cruise control module of a vehicle 1100 to use a cruise control parameter in accordance with embodiments of this disclosure. The vehicle 1100 includes modules (e.g., systems or components), a subset of which is illustrated in FIG. 11. The vehicle 1100 receives a control signal 1102 from a remote system 1104. The remote system 1104 is communicatively connected to the vehicle 1100. The remote system 1104 can be a cloud-based system or server that receives vehicle data, such as the vehicle data 406 of FIG. 4, maintains a long-term shared world model, as described herein, and transmits control signals to vehicles including the vehicle 1100. In different implementations, the control signal 1102 can be or can be similar to at least one of the control signal 312 of FIG. 3, the flows, densities, and velocities 414 of FIG. 4, the control signals 718 of FIG. 7, or the control signal 812 of FIG. 8.

The control signal 1102 can be received by a congestion controller 1106 of the vehicle 1100. As described above, in some implementations, the control signal can be or include a cruise control parameter; in other implementations, the control signal can be data that the congestion controller 1106 can use to obtain (e.g., predict, calculate, etc.) one or more cruise control parameters. In either case, the congestion controller 1106 configures a cruise control module 1108 of the vehicle 1100 using the cruise control parameter (e.g., a cruise control parameter 1112).

Independent of being configured via the congestion controller 1106, the cruise control module 1108 may be configured by an occupant (e.g., a driver) of the vehicle 1100. For example, one or more controls (e.g., buttons on a dashboard or a steering wheel) may be available to the occupant to configure parameters of the cruise control module 1108. Using the controls (not shown), the occupant may be able to set a speed for the vehicle and the cruise control module 1108 maintains that speed while cruise control module 1108 is engaged (e.g., turned on or enabled). Such controls enable the occupant to enable (e.g., turn on) the cruise control module 1108. If the cruise control module 1108 is not enabled (e.g., is off), then a driver (an in-vehicle driver or a remote operator) would be fully controlling the vehicle 1100.

In an example, if the cruise control module 1108 is not enabled, then the congestion controller 1106 may not configure the cruise control module 1108. Instead, the congestion controller 1106 may output or cause to be output a notification to an occupant of the vehicle 1100. To illustrate, the notification can essentially state "congestion detected ahead. Please reduce your speed to x to minimize stop-and-go traffic," where x is the cruise control parameter. In an example, and in the case that the cruise control module 1108 is enabled, the congestion controller 1106 may output or cause to be output a notification before or after configuring the cruise control parameter for the cruise control module 1108. To illustrate, the notification can essentially state "congestion detected ahead. Your speed will be reduced to x to minimize stop-and-go traffic," where x is the cruise control parameter. Notifications may be output in one or more modalities, such as visual, audible, haptic, or other modalities.

As mentioned, the cruise control module 1108 can be an ACC module. Accordingly, the occupant may be able to set a speed and a headway for the vehicle 1100. In either case, the cruise control module 1108 can issue control commands (e.g., to set a speed) to a vehicle motion controller 1110, which controls actuators (e.g., to press the gas pedal, to apply the brakes, or the like) of the vehicle 1100 according to the commands received from the cruise control module 1108. To illustrate, the output of the cruise control module 1108 to the vehicle motion controller 1110 may be an acceleration and the vehicle motion controller 1110 controls actuators of the vehicle 1100 to achieve the desired acceleration.

As such, the congestion controller 1106 can be an add-on module to, or implemented in, a vehicle that already includes a cruise control module. As such, the cruise control module 1108 of the vehicle 1100 can continue to operate according to its design and certification. Otherwise, any modification to the functioning of the cruise control module 1108 itself may invalidate its safety and performance certification. That is, if congestion control were to be implemented by the cruise control module 1108 (such as by re-programming or modifying the cruise control module 1108 to implement techniques described herein with respect to the congestion controller 1106), or if the cruise control module 1108 were to be replaced with a controller that performs cruise control functions and congestion control functions, as described herein, then such may invalidate the certification of the cruise control module 1108. Furthermore, such would require re-programming the ACC modules of all participating vehicles, possibly from different manufacturers, which may not be practical. This is hard to realize.

Having a congestion controller that is independent of the cruise control module of a vehicle and that provides inputs to the cruise control module that are according to the design and certification of the cruise control module results in a scalable congestion control solution that can be implemented in vehicle models from many manufacturers without invalidating cruise control modules therein. The congestion controller can adjust the cruise control parameters of the cruise control module. The cruise control module can remain unchanged and performance guarantees offered by the cruise control module can be maintained (e.g., are not invalidated).

Traffic congestions typically result from the humans driving patterns and behaviors. Human drivers tend to wait until it is too late to start braking and as a result, surrounding vehicles come to a stop. If at least some drivers slowed down slightly (e.g., by 2-3 miles) earlier in time, by the time these drivers arrive at a slowdown, the slow down would have dissipated. Additionally, human drivers may not even be aware of a traffic congestion because the congestion is out of view of the drivers.

If a certain percentage (e.g., 10%) of vehicles driving in a traffic stream are configured similarly to the vehicle 1100 (e.g., include the congestion controller 1106), and in the case of predicted or actual congested traffic ahead, then at least some of such vehicles would adjust their respective cruise control parameters (e.g., speeds) at least slightly, which in turn causes traffic to flow smoothly again. If these vehicles were to start slowing down at least slightly ahead of a traffic congestion (e.g., half a mile) in advance, that in turn might cause the traffic congestion to dissipate. Typically, if one vehicle slows down, then surrounding vehicles (or at least following vehicles) would also be slowed down. A congestion controller according to this disclosure would slow down a vehicle earlier in time than a human driver approaching a congested area.

The congestion controller 1106 may continuously (i.e., at a certain frequency, such as 1 HZ, 10 HZ, or some other frequency) receive control signals from the remote system 1104 and can change the cruise control parameter of the cruise control module based on the received control signals. As such, and as described above, when at least certain number of vehicles include the congestion controller 1106, traffic can be moderated so as to eliminate (or at least reduce) traffic congestion.

In an example, the congestion controller 1106 may communicate (e.g., transmit, transfer, etc.) the cruise control parameter to the cruise control module 1108 via a controller area network (CAN) bus of the vehicle 1100. In an example, instead of, or in an addition to, inputting the cruise control parameter to the cruise control module 1108, the congestion controller 1106 may modify the sensor data that are used by the cruise control module 1108 to maintain the configured speed or headway. For example, the congestion controller 1106 may modify the sensor data or data obtained therefrom to indicate that a leading vehicle is moving at a slower speed than it is actually moving at. As such, the cruise control module 1108 would reduce the speed of the vehicle 1100 to maintain the configured headway.

Figure 12:
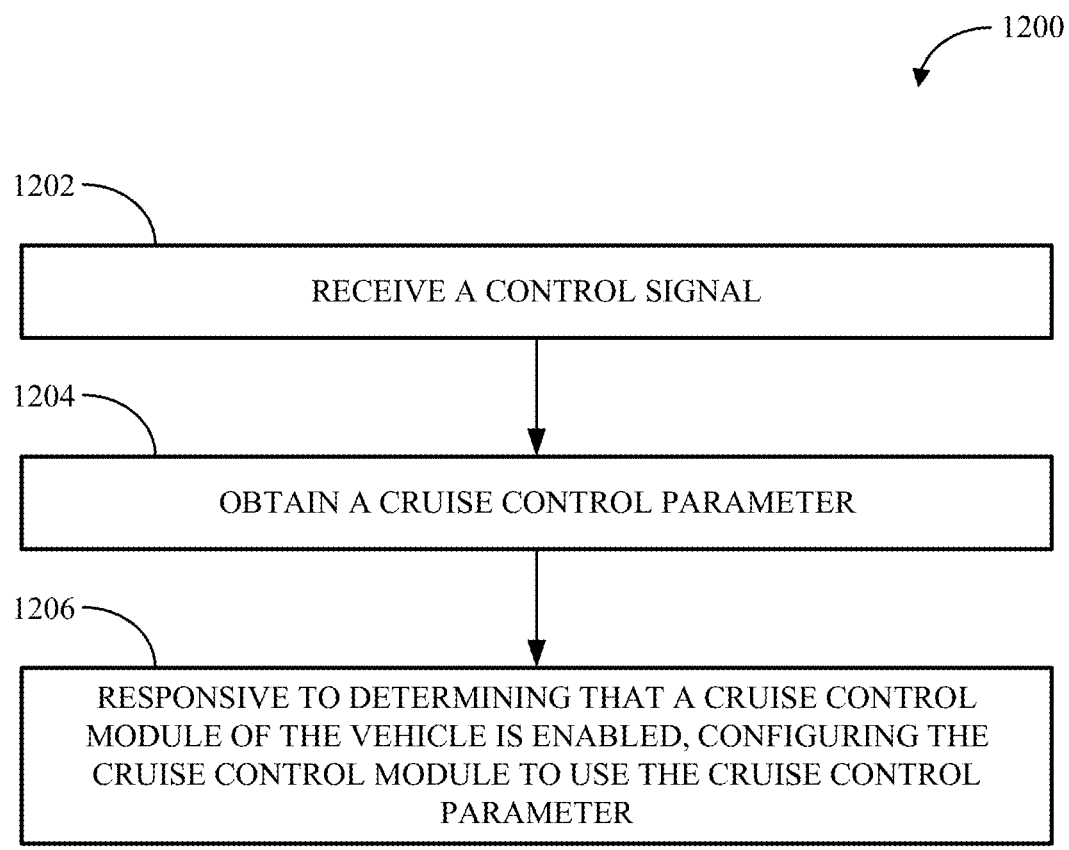
FIG. 12 is a flow chart of a technique for configuring a cruise control module to use a cruise control parameter in accordance with embodiments of this disclosure.

FIG. 12 is a flow chart of a technique 1200 for configuring a cruise control module to use a cruise control parameter in accordance with embodiments of this disclosure. The technique 1200 may be implemented at or by a vehicle that includes a cruise control module. The technique 1200 may be implemented as executable instructions that may be stored in a memory, such as a memory 134 of FIG. 1. The instructions can be executed by a processor, such as the processor 133 of FIG. 1.

At block 1202, a control signal is received. The control signal is received by a processor of the vehicle from a remote server. The control signal can be related to a road segment. In an example the road segment can be a segment that is beyond a range of sensors of the vehicle. That is, the sensors of the vehicles cannot perceive the road segment or objects (e.g., vehicles, obstacles, thereupon). In an example, the control signal can include flows, densities, and velocities, which can be as described with respect to flows, densities, and velocities 414 of FIG. 4. The control signal can be or include traffic flow data that can be as described with respect to the flow graphs over space and time of FIG. 5. In another example, the control signal can itself be or include a cruise control parameter.

At block 1204, the cruise control parameter is obtained. The cruise control parameter can be obtained by a congestion controller, such as the congestion controller 1106 of FIG. 11. In an example, and as mentioned, the control signal can be or include the cruise control parameter. In an example, the cruise control parameter may be determined by the remote server, which may be a multivehicle policy selector, such as the cooperative multivehicle policy selector 716 of FIG. 7 or the multivehicle policy selector 808 of FIG. 8, which can leverages the optimization engine 810 to optimize for traffic conditions, as described above.

In another example, the control signal can be or include data (such as at least the flows, densities, and velocities 414 of FIG. 4) that the congestion controller uses to obtain the cruise control parameter. The congestion controller can be a machine learning model, such as a neural network, that can is trained to receive, as inputs that are obtained from the received control signal. The inputs can be traffic data that include one or more of traffic density, distance between the vehicle and the road segment, distance between the vehicle and a congested location (as determined or identified at the remote server), data indicative of traffic speed in an area surrounding the vehicle, respective speeds of vehicles around the vehicle (e.g., respective speeds of other vehicles proximate to the vehicle), fewer inputs, more inputs, or a combination thereof and outputs the cruise control parameter. The cruise control parameter can be used to adjust (e.g., configure) at least a speed of the vehicle. The machine learning model may be trained using a loss function that optimizes for energy use on roadway segments, such as roadway segments that are between a vehicle and a congested area or an area that is predicted to be or become congested.

At block 1206, responsive to determining that a cruise control function of the vehicle is enabled, the cruise control module can be configured to use the cruise control parameter. The cruise control module operates to maintain the cruise control parameter for the vehicle. In an example, the cruise control module is an adaptive cruise control module that operates to maintain a configured headway and a configured speed such that the configured speed is reduced to maintain the configured headway. As such, the cruise control parameter can include a headway and a speed. The cruise control module can be configured to use the headway and the speed. In an example, the cruise control parameter includes or is a speed (i.e., a speed value) and the cruise control module can be configured to maintain the speed.

In an example, a notification can be output to an occupant of the vehicle indicating that a configuration of the cruise control module is changed using the cruise control parameter. In an example, responsive to determining that the cruise control module of the vehicle is not enabled, a notification is output to an occupant of the vehicle indication a recommendation to the occupant to enable the cruise control module according to the cruise control parameter.

Figure 13:
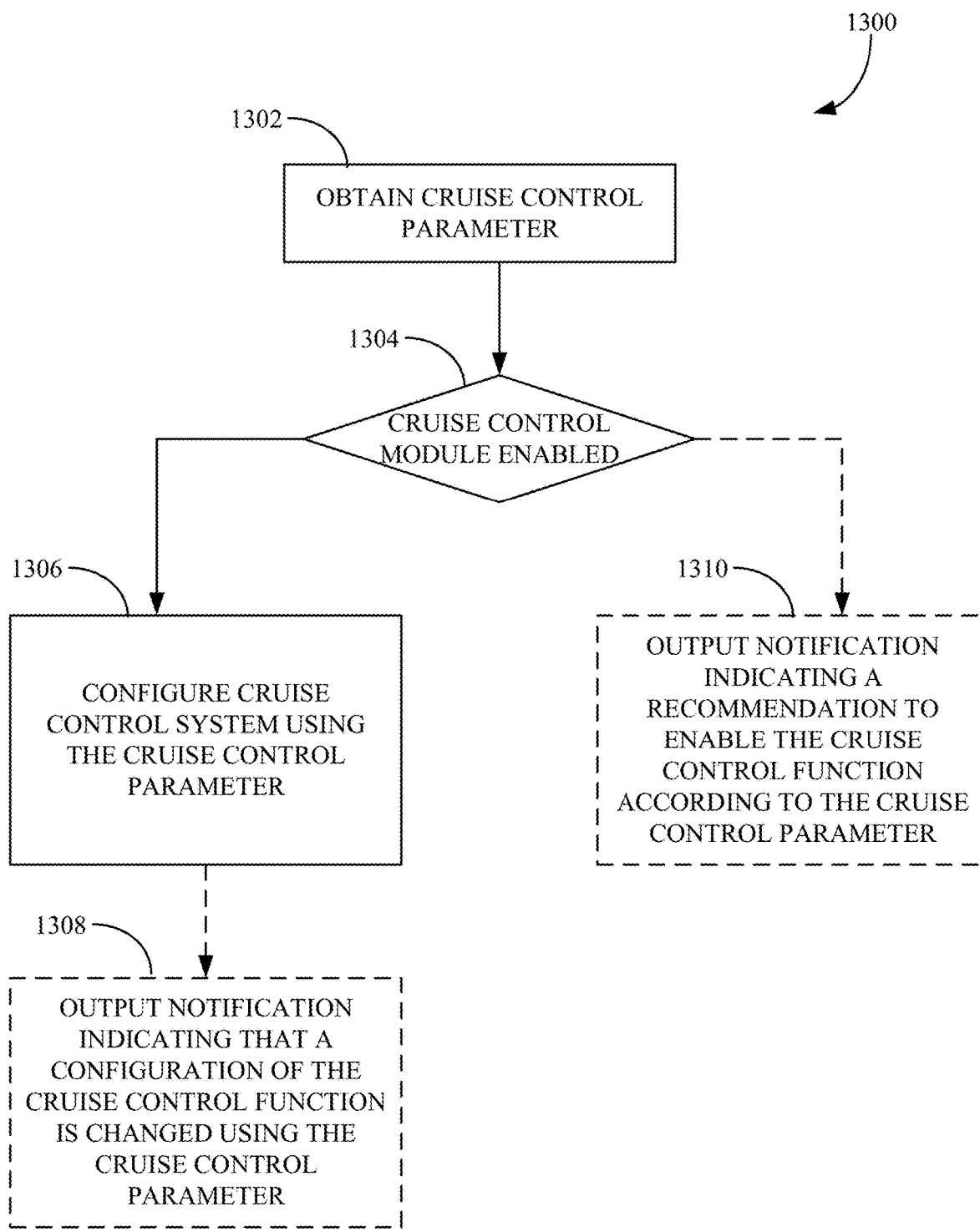
FIG. 13 is a flow chart of another technique for configuring a cruise control module to use a cruise control parameter in accordance with embodiments of this disclosure.

FIG. 13 is a flow chart of a technique 1300 for configuring a cruise control module to use a cruise control parameter in accordance with embodiments of this disclosure. The technique 1300 may be implemented at or by a vehicle that includes a cruise control module. The technique 1300 may be implemented as executable instructions that may be stored in a memory, such as a memory 134 of FIG. 1. The instructions can be executed by a processor, such as the processor 133 of FIG. 1.

At block 1302, the technique 1300 obtains a cruise control parameter. The cruise control parameter can be obtained as described above. At block 1304, the technique 1300 determines whether a cruise control module of the vehicle is enabled. As mentioned above, the cruise control module may be determined to be enabled based an occupant of the vehicle enabling (e.g., activating) the cruise control module. In another example, the cruise control module may be considered to be enabled whether specifically activated or not by an occupant. That is, regardless of whether an occupant enabled the cruise control module, the technique 1300 can configure the cruise control module using a cruise control parameter.

If the cruise control module is enabled, the technique 1300 proceeds to block 1306. In some implementations, if the cruise control module is not enabled, the technique 1300 terminates. In other implementations, if the cruise control module is not enabled, the technique 1300 proceeds to block 1310.

At block 1306, the cruise control module can be configured using the cruise control parameter. In some implementations, the technique 1300 may output, at block 1308, a notification indicating that a configuration of the cruise control function is changed using the cruise control parameter. At block 1310, the technique 1300 may output a notification indicating a recommendation to enable the cruise control function according to the cruise control parameter.

As used herein, the terminology "instructions" may include directions or expressions for performing any technique, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, techniques, or combinations thereof, as described herein. Instructions, or a portion thereof, may be implemented as a special purpose processor, or circuitry, that may include specialized hardware for carrying out any of the techniques, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the techniques disclosed herein may occur in various orders or concurrently. Additionally, elements of the techniques disclosed herein may occur with other elements not explicitly presented and described herein. Furthermore, not all elements of the techniques described herein may be required to implement a technique in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method, comprising:
    receiving, from a remote server and by a processor of a vehicle, a control signal related to a road segment;
    obtaining, using at least a portion of the control signal, a cruise control parameter for controlling the vehicle, wherein the cruise control parameter is obtained from a machine-learning model executing at the vehicle, the machine-learning model receives input comprising a distance to the road segment, data indicative of traffic speed, and respective speeds of other vehicles proximate to the vehicle and outputs the cruise control parameter; and
    responsive to determining that a cruise control module of the vehicle is enabled, configuring the cruise control module to use the cruise control parameter, wherein the cruise control module operates to maintain the cruise control parameter for the vehicle.

2. The method of claim 1, wherein the control signal comprises the cruise control parameter.

3. The method of claim 1,
    wherein the cruise control module is an adaptive cruise control module that operates to maintain a configured headway and a configured speed such that the configured speed is reduced to maintain the configured headway,
    wherein the cruise control parameter comprises a headway and a speed, and
    wherein configuring the cruise control module to use the cruise control parameter comprises:
    configuring the cruise control module to use the headway and the speed.

4. The method of claim 1,
    wherein the cruise control parameter comprises a speed, and
    wherein configuring the cruise control module to use the cruise control parameter comprises:
    configuring the cruise control module to maintain the speed.

5. The method of claim 1, further comprising:
    outputting a notification to an occupant of the vehicle, wherein the notification indicates that a configuration of the cruise control module is changed using the cruise control parameter.

6. The method of claim 1, further comprising:
    responsive to determining that the cruise control module of the vehicle is not enabled, outputting a notification to an occupant of the vehicle, wherein the notification indicates a recommendation to the occupant to enable the cruise control module according to the cruise control parameter.

7. The method of claim 1, wherein the road segment is beyond a range of sensors of the vehicle.

8. A vehicle, comprising:
a cruise control module; and
a congestion controller configured to input cruise control configuration parameters to the cruise control module, the congestion controller is configured to:
receive, from a remote server, a control signal related to a road segment;
obtain, using at least a portion of the control signal, a cruise control parameter for controlling the vehicle, wherein the cruise control parameter is obtained from a machine-learning model that receives input comprising a distance to the road segment, data indicative of traffic speed, and respective speeds of other vehicles proximate to the vehicle and outputs the cruise control parameter; and
configure the cruise control module to use the cruise control parameter.

9. The vehicle of claim 8, wherein the control signal comprises the cruise control parameter.

10. The vehicle of claim 8,
wherein the cruise control module is an adaptive cruise control module that operates to maintain a configured headway and a configured speed such that the configured speed is reduced to maintain the configured headway,
wherein the cruise control parameter comprises a headway and a speed, and
wherein to configure the cruise control module to use the cruise control parameter comprises to:
configure the cruise control module to use the headway and the speed.

11. The vehicle of claim 8,
wherein the cruise control parameter comprises a speed, and
wherein to configure the cruise control module to use the cruise control parameter comprises to:
configure the cruise control module to maintain the speed.

12. The vehicle of claim 8, wherein the congestion controller is further configured to:
output a notification to an occupant of the vehicle, wherein the notification indicates that a configuration of the cruise control module is changed using the cruise control parameter.

13. The vehicle of claim 8, wherein the congestion controller is further configured to:
responsive to determining that the cruise control module of the vehicle is not enabled, output a notification to an occupant of the vehicle, wherein the notification indicates a recommendation to the occupant to enable the cruise control module according to the cruise control parameter.

14. A non-transitory computer-readable medium storing instructions which, when executed by a processor of a vehicle, cause the processor to perform operations comprising:
receiving, from a remote server, a control signal related to a road segment;
obtaining, using at least a portion of the control signal, a cruise control parameter for controlling the vehicle, wherein the cruise control parameter is obtained from a machine-learning model that receives input comprising a distance to the road segment, data indicative of traffic speed, and respective speeds of other vehicles proximate to the vehicle and outputs the cruise control parameter; and
responsive to determining that a cruise control module of the vehicle is enabled, configuring the cruise control module to use the cruise control parameter, wherein the cruise control module operates to maintain the cruise control parameter for the vehicle.

15. The non-transitory computer-readable medium of claim 14,
wherein the cruise control module is an adaptive cruise control module that operates to maintain a configured headway and a configured speed such that the configured speed is reduced to maintain the configured headway,
wherein the cruise control parameter comprises a headway and a speed, and
wherein configuring the cruise control module to use the cruise control parameter comprises:
configuring the cruise control module to use the headway and the speed.

16. The non-transitory computer-readable medium of claim 14,
wherein the cruise control parameter comprises a speed, and
wherein configuring the cruise control module to use the cruise control parameter comprises:
configuring the cruise control module to maintain the speed.

17. The non-transitory computer-readable medium of claim 14, wherein the operations further comprise:
responsive to determining that the cruise control module of the vehicle is not enabled, outputting a notification to an occupant of the vehicle, wherein the notification indicates a recommendation to the occupant to enable the cruise control module according to the cruise control parameter.

18. The non-transitory computer-readable medium of claim 14, wherein the operations further comprise:
outputting a notification to an occupant of the vehicle, wherein the notification indicates that a configuration of the cruise control module is changed using the cruise control parameter.

19. The non-transitory computer-readable medium of claim 14, wherein the road segment is beyond a range of sensors of the vehicle.

* * * * *